United States Patent
Chih et al.

(10) Patent No.: US 11,550,176 B2
(45) Date of Patent: Jan. 10, 2023

(54) DISPLAY DEVICE COMPRISING AN ELECTRONICALLY CONTROLLED PHASE RETARDATION MODULE HAVING A CONDUCTIVE LAYER FORMED DIRECTLY ON A SUBSTRATE OF A POLARIZING FILM

(71) Applicant: Coretronic Corporation, Hsin-Chu (TW)

(72) Inventors: Ming-Chuan Chih, Hsin-Chu (TW); Wen-Chun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/364,879

(22) Filed: Jun. 30, 2021

(65) Prior Publication Data

US 2022/0004054 A1 Jan. 6, 2022

(30) Foreign Application Priority Data

Jul. 3, 2020 (CN) .......................... 202021286363.3

(51) Int. Cl.
*G02F 1/13* (2006.01)
*G02F 1/13363* (2006.01)
*G02F 1/1335* (2006.01)

(52) U.S. Cl.
CPC ........ *G02F 1/1323* (2013.01); *G02F 1/13363* (2013.01); *G02F 1/133531* (2021.01)

(58) Field of Classification Search
CPC ............. G02F 1/1395; G02F 1/133635; G02F 2203/62; G02F 2203/07; G02F 1/133769; G02F 1/13356
See application file for complete search history.

(56) References Cited

U.S. PATENT DOCUMENTS

| | | | |
|---|---|---|---|
| 10,895,777 B1* | 1/2021 | Lin | G02F 1/133502 |
| 2008/0273145 A1* | 11/2008 | Akiyama | G09G 3/3611 |
| | | | 349/84 |
| 2016/0097943 A1* | 4/2016 | Mimura | G02F 1/1309 |
| | | | 345/214 |
| 2018/0321523 A1* | 11/2018 | Robinson | G02F 1/133602 |

FOREIGN PATENT DOCUMENTS

| | | |
|---|---|---|
| TW | 200630665 | 9/2006 |
| TW | 200844616 | 11/2008 |
| TW | 201300885 | 1/2013 |

* cited by examiner

*Primary Examiner* — Paul C Lee
(74) *Attorney, Agent, or Firm* — JCIPRNET (57) ABSTRACT

A display device, including a first polarizing film, a pixel array module, a second polarizing film, and a first electronically controlled phase retardation module, is provided. The pixel array module is disposed in overlap with the first polarizing film. The second polarizing film is disposed in overlap with the pixel array module. The first electronically controlled phase retardation module includes a first liquid crystal layer, two first alignment layers, and two first conductive layers. The first liquid crystal layer and the first alignment layers are disposed between the first conductive layers. The second polarizing film is located between the pixel array module and the first electronically controlled phase retardation module. One of the first polarizing film and the second polarizing film directly contacts one of the first conductive layers of the first electronically controlled phase retardation module. The display device has a switchable viewing angle and is thinner and lighter.

9 Claims, 8 Drawing Sheets

DISPLAY DEVICE COMPRISING AN ELECTRONICALLY CONTROLLED PHASE RETARDATION MODULE HAVING A CONDUCTIVE LAYER FORMED DIRECTLY ON A SUBSTRATE OF A POLARIZING FILM

CROSS-REFERENCE TO RELATED APPLICATION

This application claims the priority benefit of China application serial no. 202021286363.3, filed on Jul. 3, 2020. The entirety of the above-mentioned patent application is hereby incorporated by reference herein and made a part of this specification.

BACKGROUND

Technical Field

The disclosure relates to a display technique, and particularly relates to a display device.

DESCRIPTION OF RELATED ART

Generally, in order to allow multiple viewers to watch together, a display device usually has a wide-viewing angle display effect. However, in certain situations or occasions, such as browsing private web pages and confidential information, or entering passwords in public, the wide-viewing angle display effect may easily result in a fact that a screen image is peeped by others to cause confidential information leakage. In order to achieve an anti-peep effect, a general practice is to place a light control film (LCF) in front of a display panel to filter out large-angle light. Conversely, when there is no need for anti-peeping, the light control film is manually removed from the front of the display panel. In other words, although this type of light control film has the anti-peep effect, it still has a room for improvement for the convenience of operation.

In order to mitigate the above problem, a display device including a display panel and an electronically controlled viewing angle switch is proposed. Through a light modulation characteristic of the electronically controlled viewing angle switch, a range of a light output angle of the display panel may be adjusted in a more convenient manner. However, a stacked structure of the display panel and the electronically controlled viewing angle switch may result in a thick appearance of such type of the display device. Therefore, how to develop a display device that is extremely convenient for viewing angle switching and is thinner and lighter has become an important issue for related manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a display device, which has a switchable viewing angle and is thinner and lighter.

In order to achieve one or a portion of or all of the objectives or other objectives, an embodiment of the disclosure provides a display device including a first polarizing film, a pixel array module, a second polarizing film, and a first electronically controlled phase retardation module. The pixel array module is disposed in overlap with the first polarizing film. The second polarizing film is disposed in overlap with the pixel array module. The first electronically controlled phase retardation module includes a first liquid crystal layer, two first alignment layers, and two first conductive layers. The first liquid crystal layer and the first alignment layers are disposed between the first conductive layers. The second polarizing film is located between the pixel array module and the first electronically controlled phase retardation module. One of the first polarizing film and the second polarizing film directly contacts one of the first conductive layers of the first electronically controlled phase retardation module.

Based on the above description, in the display device of an embodiment of the disclosure, by using one of the first polarizing film and the second polarizing film located between the pixel array module and the electronically controlled phase retardation module to directly contact the conductive layer of the electronically controlled phase retardation module, an overall thickness of the display device is effectively reduced, and light energy usage efficiency thereof is enhanced.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
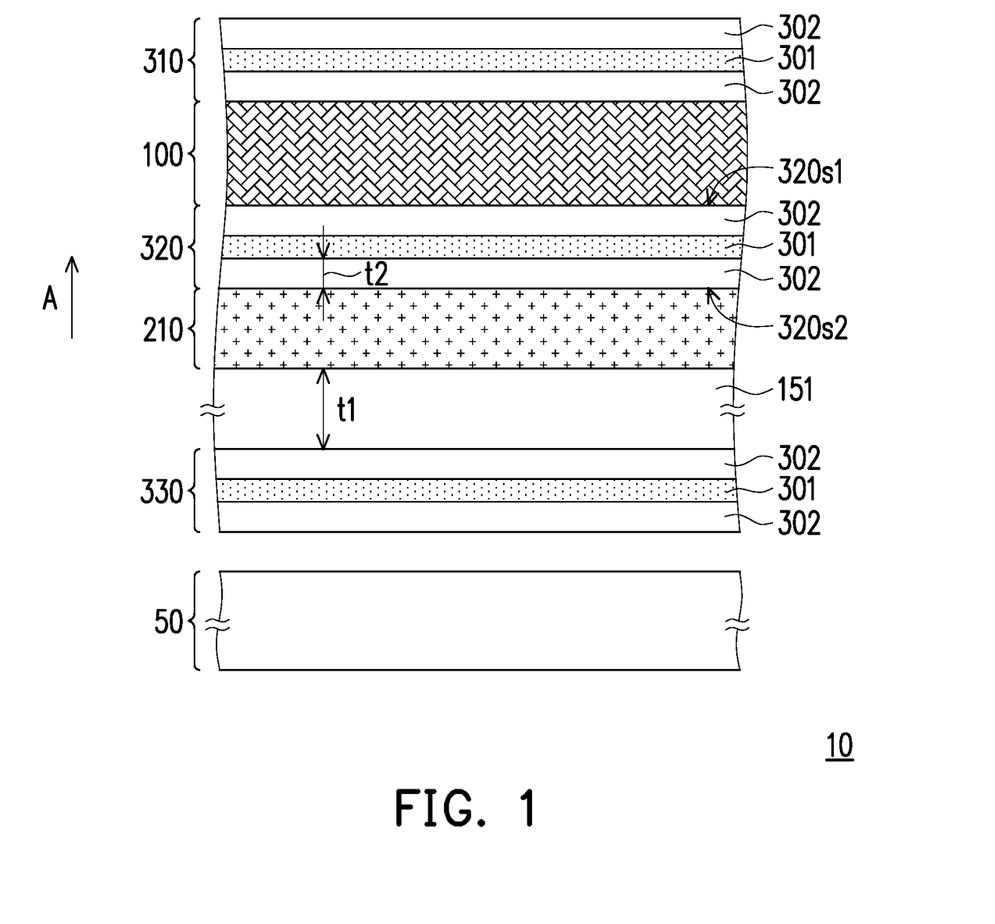
FIG. 1 is a schematic cross-sectional view of a display device according to a first embodiment of the disclosure.
Figure 2:
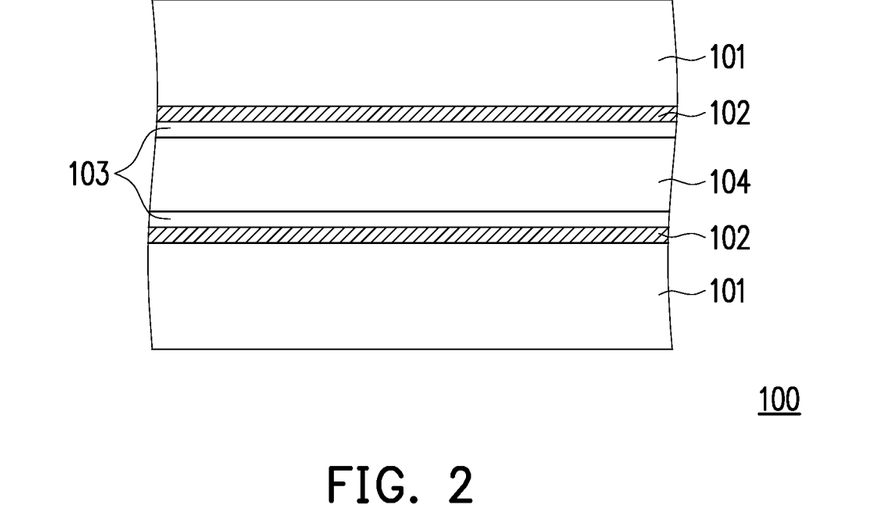
FIG. 2 is a schematic cross-sectional view of a pixel array module of FIG. 1.
Figure 3:
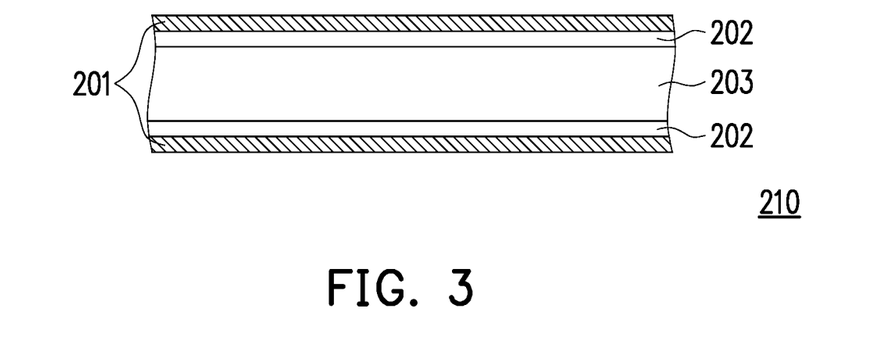
FIG. 3 is a schematic cross-sectional view of a first electronically controlled phase retardation module of FIG. 1.

FIG. 1 is a schematic cross-sectional view of a display device according to a first embodiment of the disclosure. FIG. 2 is a schematic cross-sectional view of a pixel array module of FIG. 1. FIG. 3 is a schematic cross-sectional view of a first electronically controlled phase retardation module of FIG. 1.

Referring to FIG. 1, FIG. 2, and FIG. 3, the display device 10 includes a pixel array module 100, a first electronically controlled phase retardation module 210, and a plurality of polarizing films 310, 320, and 330. The pixel array module 100 is disposed in overlap with the first electronically controlled phase retardation module 210 and the polarizing films 310, 320, and 330. The pixel array module 100 and the first electronically controlled phase retardation module 210 are respectively disposed between the polarizing films 310, 320, and 330. It should be noted that in the embodiment, one electronically controlled phase retardation modules is taken as an example for description, but it does not mean that the disclosure is limited by the content disclosed in the drawings. In other embodiments, the number of the electronically controlled phase retardation modules may also be adjusted to two or more according to actual design requirements.

In detail, in the embodiment, the polarizing films 310, 320, and 330 are taken as an example for exemplary description, but the disclosure is not limited thereto. The pixel array module 100 is disposed between the polarizing film 310 and the polarizing film 320. The polarizing film 320 is disposed between the pixel array module 100 and the first electronically controlled phase retardation module 210. The pixel array module 100 and the first electronically controlled phase retardation module 210 directly contact two opposite surfaces 320s1 and 320s2 of the polarizing film 320, respectively. The first electronically controlled phase retardation module 210 is disposed between the polarizing film 330 and the polarizing film 320. In the embodiment, the display device 10 may also selectively include a first type substrate 151. The first type substrate 151 is disposed in overlap with the pixel array module 100 and is located between the first electronically controlled phase retardation module 210 and the polarizing film 330, but the disclosure is not limited thereto. A material of the first type substrate 151 may include glass, quartz, organic polymer, Triacetyl Cellulose (TAC) or a polymer material.

Further referring to FIG. 2, the pixel array module 100 may include two substrates 101, two conductive layers 102, two alignment layers 103 and a liquid crystal layer 104. The two conductive layers 102 are disposed between the two substrates 101 and are respectively disposed on two sides surfaces of the two substrates 101 opposite to each other. The two alignment layers 103 and the liquid crystal layer 104 are disposed between the two conductive layers 102, and the liquid crystal layer 104 is sandwiched between the two alignment layers 103 (as shown in FIG. 2). Namely, the pixel array module 100 of the embodiment is, for example, applied to a liquid crystal display panel, but the disclosure is not limited thereto. In particular, in FIG. 2, a single pixel unit in the pixel array module 100 is illustrated as an example, and it should be understood that the pixel array module 100 applied to the liquid crystal display panel includes a plurality of pixel units arranged in an array. On the other hand, referring to FIG. 3, the first electronically controlled phase retardation module 210 includes two conductive layers 201, two alignment layers 202 and a liquid crystal layer 203. The alignment layers 202 and the liquid crystal layer 203 are arranged between the conductive layers 201, and the liquid crystal layer 203 is sandwiched between the two alignment layers 202.

It should be understood that since the pixel array module 100 of the embodiment is applied to a non-self-luminous display panel (such as a liquid crystal display panel), the display device 10 may further include a backlight module 50 (as shown in FIG. 1) to provide an illumination light beam (not shown), but the disclosure is not limited thereto. The illumination light beam forms an image light beam (not shown) after passing through the pixel array module 100 and is transmitted to human eyes to form an image. In the embodiment, the backlight module 50 is disposed in overlap with the pixel array module 100 and the first electronically controlled phase retardation module 210. The first electronically controlled phase retardation module 210 may be selectively located between the pixel array module 100 and the backlight module 50, but the disclosure is not limited thereto.

Further, referring to FIG. 1, the polarizing film 310, the polarizing film 320, and the polarizing film 330 respectively have a polarizer 301 and two second type substrates 302 arranged on two opposite sides of the polarizer 301. The polarizer 301 is fabricated through, for example, a stretching manner. It should be noted that in the embodiment, the first electronically controlled phase retardation module 210 is disposed between the first type substrate 151 and the second type substrate 302 of the polarizing film 320. The two conductive layers 201 of the first electronically controlled phase retardation module 210 directly contact the first type substrate 151 and the second type substrate 302, respectively. In other words, the two conductive layers 201 of the first electronically controlled phase retardation module 210 are directly formed on the surfaces of the first type substrate 151 and the second type substrate 302 of the polarizing film 320, respectively.

Figure 4:
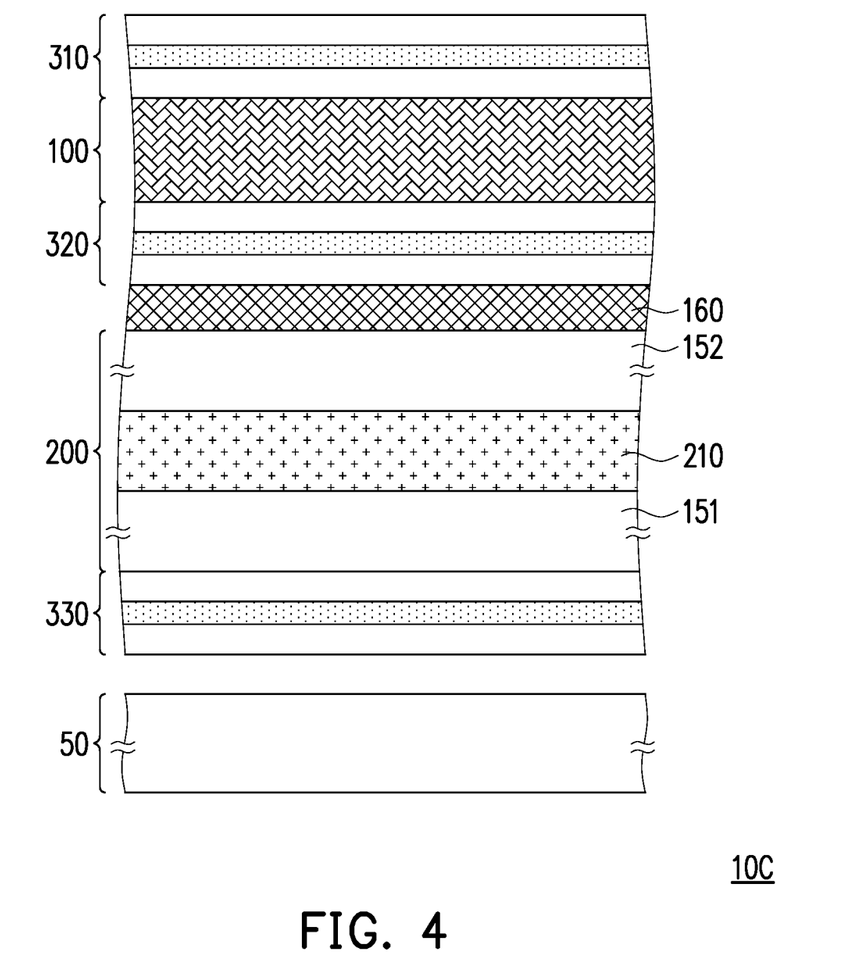
FIG. 4 is a schematic cross-sectional view of a display device of a comparative example.

Further, FIG. 4 is a schematic cross-sectional view of a display device of a comparative example. Referring to FIG. 1 and FIG. 4 at the same time, an electronically controlled phase retarder 200 of a display device 10C of the comparative example includes the first electronically controlled phase retardation module 210, the first type substrate 151 and a first type substrate 152, and an adhesive layer 160 is used to attach the electronically controlled phase retarder 200 and the polarizing film 320. Therefore, compared with the display device 10C of the comparative example, the display device 10 of the embodiment of FIG. 1 may omit the arrangement of another first type substrate 152 and the adhesive layer 160, where a material of the adhesive layer 160 includes an optical clear adhesive (OCA) or hardened optical clear resin (OCR). Namely, in the embodiment of FIG. 1, by directly forming the conductive layer 201 of the first electronically controlled phase retardation module 210 on the second type substrate 302 of the polarizing film 320, an overall thickness of the display device 10 may be effectively reduced, and light energy usage efficiency thereof may be enhanced. In the embodiment of FIG. 1, the first type substrate 151 and the second type substrate 302 respectively have a thickness t1 and a thickness t2 in a direction perpendicular to the surface 320s2 of the polarizing film 320 (for example, thickness in a direction A, and the direction A is, for example, parallel to a normal direction of the surface 320s2 of the polarizing film 320), and the thickness t2 of the second type substrate 302 may be less than the thickness t1 of the first type substrate 151. Accordingly, the overall thickness of the display device 10 may be further reduced.

In the embodiment, a material of the second type substrate 302 may be glass, ceramic, sapphire, or other transparent inorganic materials. However, the disclosure is not limited thereto, and in other embodiments, the material of the second type substrate 302 may also be polyethylene terephthalate (PET), polyethylene naphthalate (PEN), polyethersulfone (PES), polymethyl methacrylate (PMMA), polycarbonate (PC), cyclic olefin copolymer (COC), polyimide (PI), triacetyl cellulose (TAC) or a composite material of the above materials.

It should be noted that in an embodiment, the second type substrate 302 may also be a transparent substrate with an optical modulation function. In other words, the material of the second type substrate 302 may also include an organic/inorganic material that may produce phase retardation. In another embodiment, the material of a part of the second type substrate 302 (for example, the second type substrate 302 of the polarizing film 310 of FIG. 1 far away from the pixel array module 100) may also include materials with surface modification properties, such as a hard coat, an anti-reflection film, or other organic/inorganic materials with anti-smudge, anti-fingerprint, anti-glare, and anti-scratch properties.

It should be noted that in the embodiment, adhesive layers (not shown) may be selectively disposed between the polarizing film 310 and the pixel array module 100, between the polarizing film 320 and the pixel array module 100, and between the first electronically controlled phase retardation module 210 and the polarizing film 330 to ensure a connection relationship between the pixel array module 100, the first electronically controlled phase retardation module 210 and the polarizing films, but the disclosure is not limited thereto.

Other embodiments are provided below to describe the disclosure in detail, where the same components are indicated by the same symbols, and the description of the same technical content will be omitted, and please referring to the aforementioned embodiments for the omitted parts, which is not repeated below.

Figure 5:
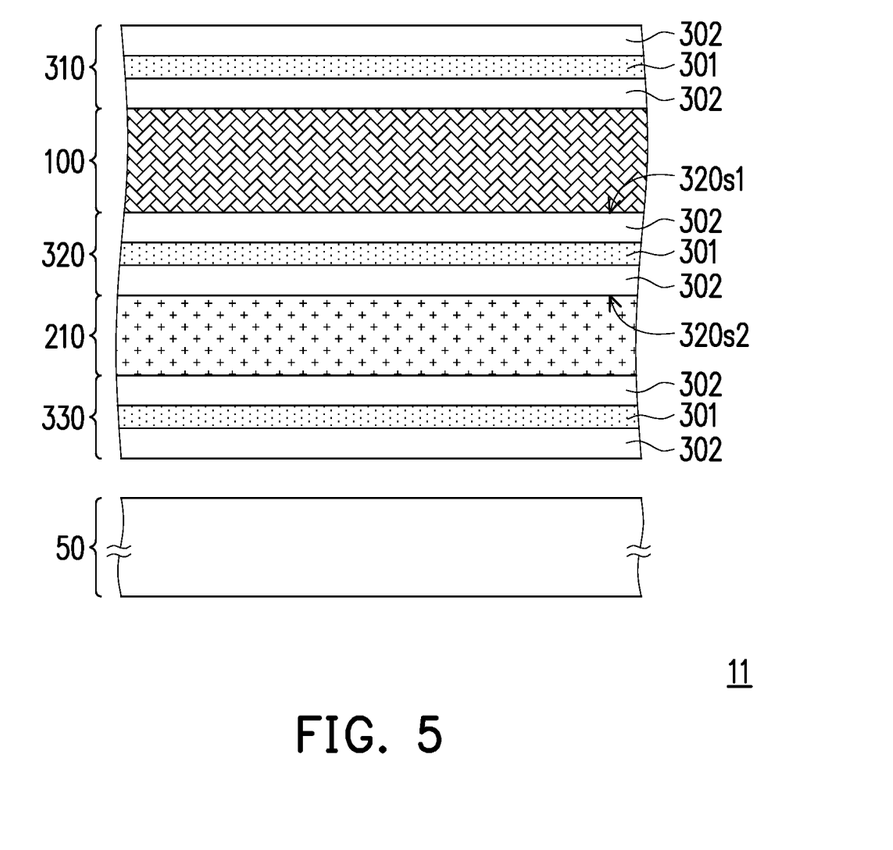
FIG. 5 is a schematic cross-sectional view of a display device according to a second embodiment of the disclosure.

FIG. 5 is a schematic cross-sectional view of a display device according to a second embodiment of the disclosure. Referring to FIG. 3 and FIG. 5, a difference between a display device 11 of the embodiment and the display device 10 of FIG. 1 is that the display device 11 does not have the first type substrate 151 of FIG. 1. Namely, the first electronically controlled phase retardation module 210 of the display device 11 is disposed between the polarizing film 320 and the polarizing film 330, and the polarizing film 320 and the polarizing film 330 of the display device 11 directly contact the first electronically controlled phase retardation module 210, respectively. To be specific, the polarizing film 320 and the polarizing film 330 of the display device 11, for example, directly contact the two conductive layers 201 of the first electronically controlled phase retardation module 210, respectively.

According to another aspect, the two conductive layers 201 of the first electronically controlled phase retardation module 210 are directly formed on the surfaces of the two opposite second type substrates 302 of the polarizing film 320 and the polarizing film 330. Accordingly, the overall thickness of the display device 11 may be further reduced, and the light energy usage efficiency thereof may be enhanced. It should be noted that in the embodiment, constructing structures of the pixel array module 100 and the first electronically controlled phase retardation module 210 are similar to that of the display device 10 of the aforementioned embodiment. Therefore, please referring to the relevant paragraphs of the aforementioned embodiment for detailed descriptions, and details thereof are not repeated.

Figure 6:
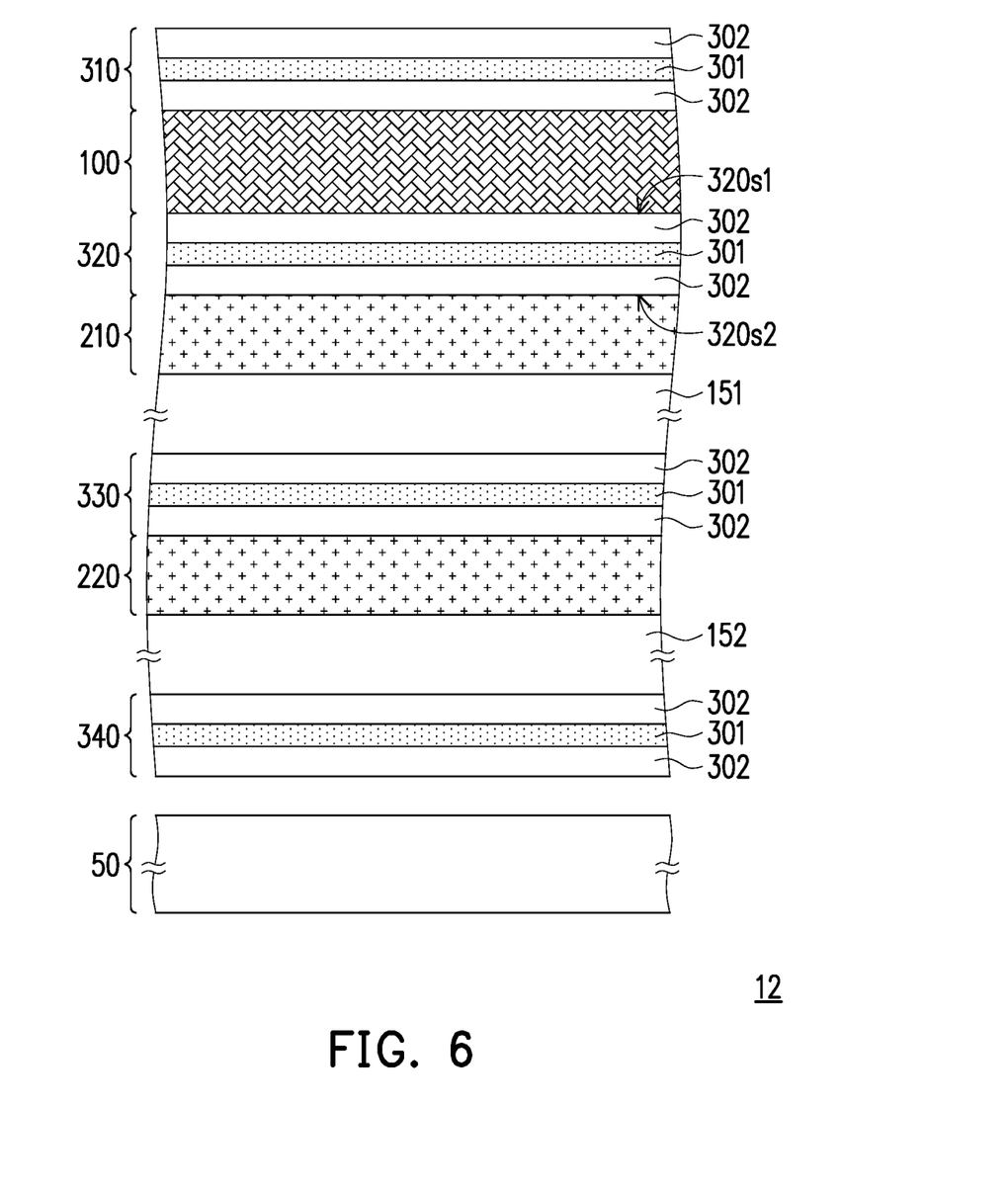
FIG. 6 is a schematic cross-sectional view of a display device according to a third embodiment of the disclosure.

FIG. 6 is a schematic cross-sectional view of a display device according to a third embodiment of the disclosure. Referring to FIG. 3 and FIG. 6, a main difference between a display device 12 of the embodiment and the display device 10 of FIG. 1 lies in different numbers of the electronically controlled phase retardation modules, the first type substrates and the polarizing films. To be specific, the display device 12 further includes a second electronically controlled phase retardation module 220, a polarizing film 340 and the first type substrate 152. The second electronically controlled phase retardation module 220 is disposed in overlap with the pixel array module 100, the first electronically controlled phase retardation module 210, the polarizing film 340 and the first type substrate 152. The first electronically controlled phase retardation module 210 is located between the pixel array module 100 and the second electronically controlled phase retardation module 220. The polarizing film 330 is located between the first electronically controlled phase retardation module 210 and the second electronically controlled phase retardation module 220.

It should be noted that in the embodiment, a constructing structure of the second electronically controlled phase retardation module 220 is similar to that of the first electronically controlled phase retardation module 210 of FIG. 3. Therefore, please referring to the relevant paragraphs of the aforementioned embodiment for detailed description, and details thereof are not repeated. It should be noted that in the embodiment, the polarizing film 330 and the first type substrate 152 directly contact the second electronically controlled phase retardation module 220, respectively. To be specific, the polarizing film 330 and the first type substrate 152 of the display device 12, for example, directly contact the two conductive layers 201 (shown in FIG. 3) of the second electronically controlled phase retardation module 220, respectively. Namely, one of the two conductive layers 201 of the second electronically controlled phase retardation module 220 is directly formed on the second type substrate 302 of the polarizing film 330. In this way, the overall thickness of the display device 12 may be effectively reduced, and the light energy usage efficiency thereof may be enhanced.

Figure 7:
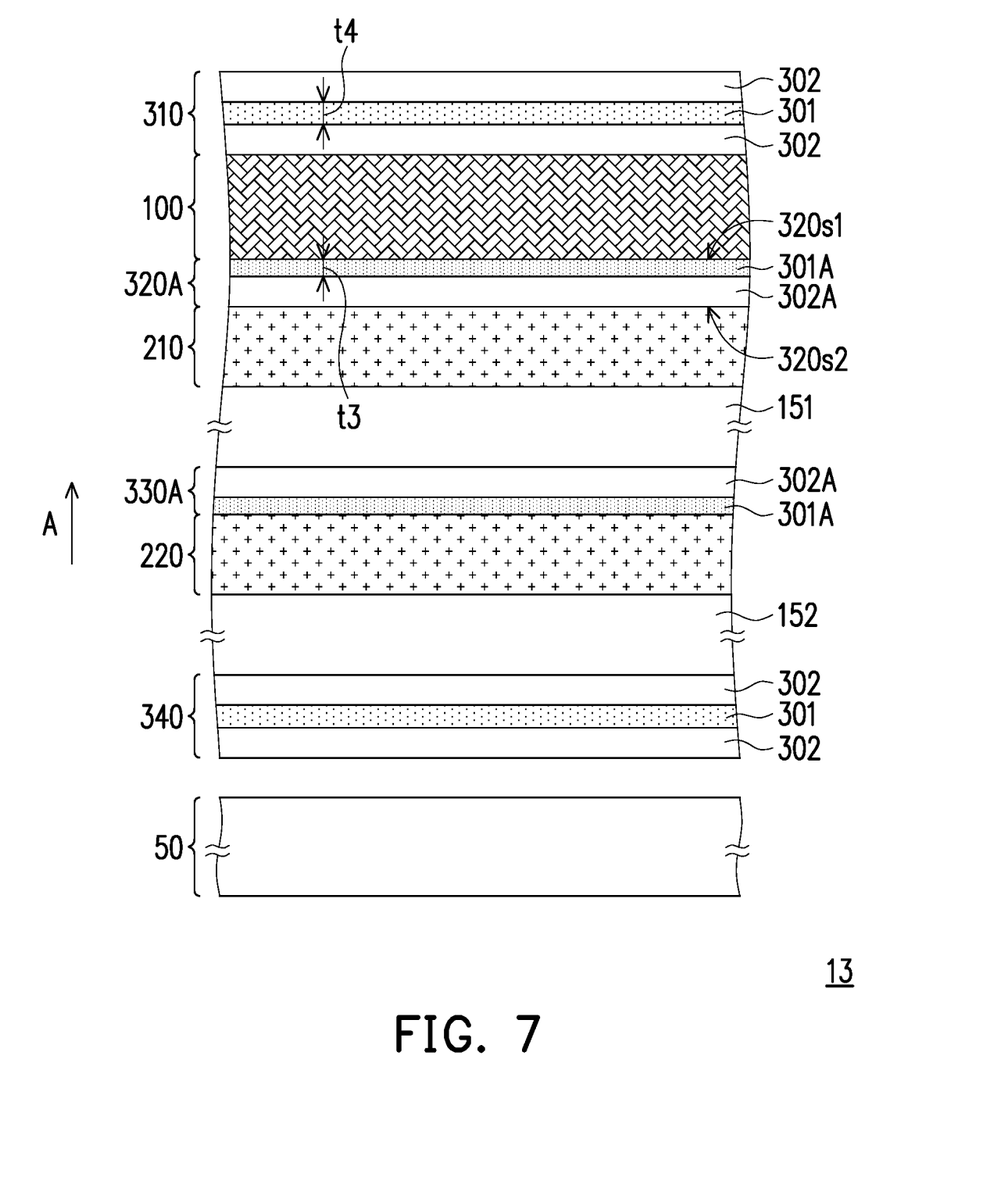
FIG. 7 is a schematic cross-sectional view of a display device according to a fourth embodiment of the disclosure.

FIG. 7 is a schematic cross-sectional view of a display device according to a fourth embodiment of the disclosure. Referring to FIG. 2, FIG. 3 and FIG. 7, a main difference between a display device 13 of the embodiment and the display device 12 of FIG. 6 lies in different compositions of a part of the polarizing films. In the embodiment, the compositions of the polarizing film 320A and the polarizing film 330A of the display device 13 may be different from that of the polarizing film 310 and the polarizing film 340. For example, polarizers 301A of the polarizing film 320A and the polarizing film 330A are manufactured by using a coating manner, and the polarizers 301 of the polarizing film 310 and the polarizing film 340 are manufactured by using the stretching manner. Therefore, a thickness t3 (for example, the thickness in the direction A) of the respective polarizer 301A of the polarizing film 320A and the polarizing film 330A may be less than a thickness t4 of the respective polarizer 301 of the polarizing film 310 and the polarizing film 340, which helps to reduce the overall thickness of the display device 13.

On the other hand, since the polarizer 301A is manufactured by using the coating manner, the polarizing film 320A and the polarizing film 330A may respectively have only one substrate 302A. In this way, the overall thickness of the display device 130 may be further reduced, and the light energy usage efficiency thereof is enhanced. In the embodiment, the substrate 302A of the polarizing film 320A directly contacts one of the two conductive layers 201 (as shown in FIG. 3) of the first electronically controlled phase retardation module 210. The polarizer 301A of the polarizing film 320A directly contacts the pixel array module 100, for example, the polarizer 301A of the polarizing film 320A directly contacts the substrate 101 of the pixel array module 100. The polarizer 301A of the polarizing film 330A directly contacts the second electronically controlled phase retardation module 220, for example, the polarizer 301A of the polarizing film 330A directly contacts the conductive layer 201 of the second electronically controlled phase retardation module 220. In the embodiment, a material of the substrate 302A of the polarizing film 320A and the material of the second type substrate 302 may be selectively the same, but the disclosure is not limited thereto.

It should be noted that the polarizing film 330A may selectively include a protective layer (not shown). The protective layer may be disposed between the second electronically controlled phase retardation module 220 and the polarizer 301A of the polarizing film 330A, and directly contacts the conductive layer 201 of the second electronically controlled phase retardation module 220. It should be noted that the disclosure is not limited to the content disclosed in FIG. 7. In other embodiments that are not shown, the polarizers of the polarizing film 310 and the polarizing film 340 may also be made through the coating manner, and the above-mentioned protective layer may be used to replace the respective one second type substrate 302 of the polarizing film 310 and the polarizing film 340. In this way, the overall thickness of the display device is further reduced. The protective layer may be a functional film layer with a hardened, anti-reflection, anti-smudge, anti-fingerprint, anti-glare, or anti-scratch function, but the disclosure is not limited thereto.

Figure 8:
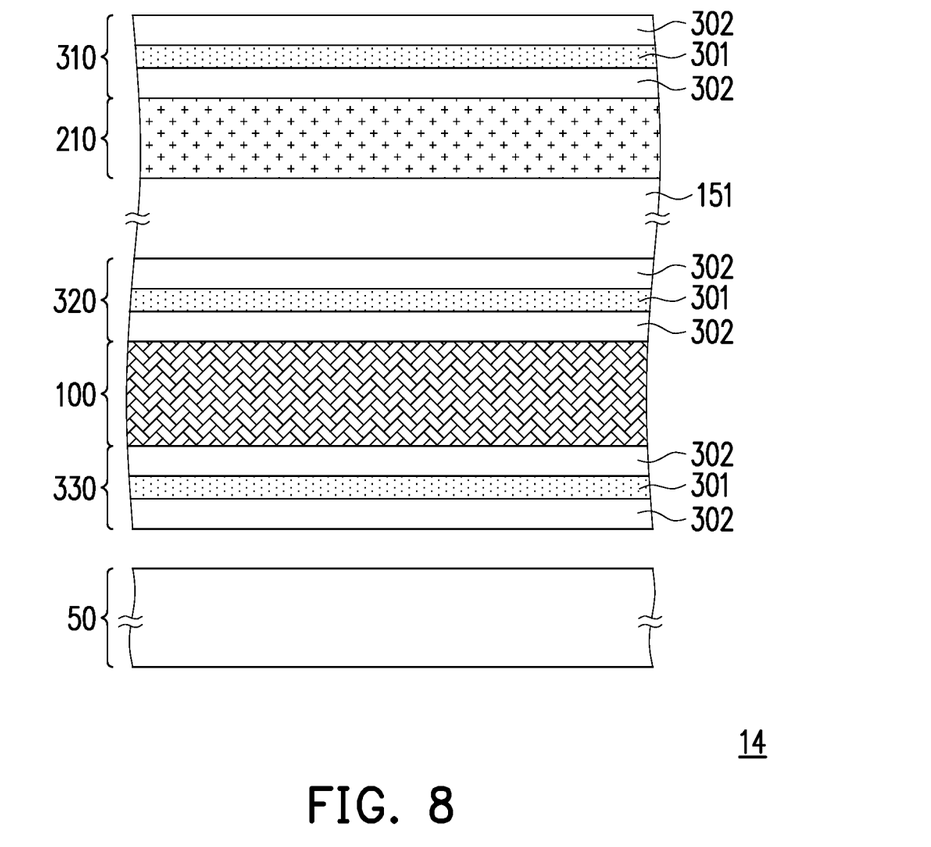
FIG. 8 is a schematic cross-sectional view of a display device according to a fifth embodiment of the disclosure.

FIG. 8 is a schematic cross-sectional view of a display device according to a fifth embodiment of the disclosure. Referring to FIG. 8, a difference between a display device 14 of the embodiment and the display device 10 of FIG. 1 lies in different configuration methods of the pixel array module and the first electronically controlled phase retardation module. To be specific, the pixel array module 100 of the display device 14 is disposed between the backlight module 50 and the first electronically controlled phase retardation module 210. The first type substrate 151 is located between the polarizing film 310 and the polarizing film 320 and directly contacts the polarizing film 320.

Figure 9:
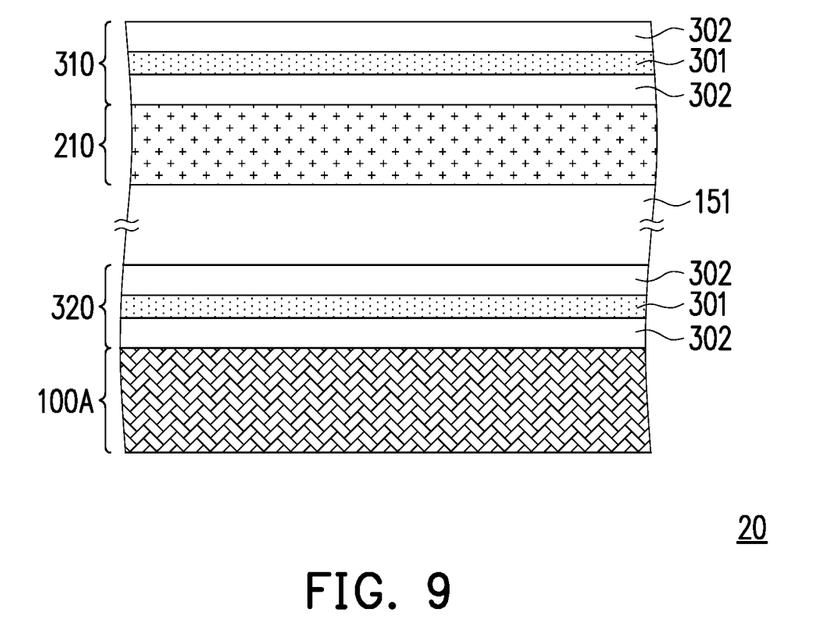
FIG. 9 is a schematic cross-sectional view of a display device according to a sixth embodiment of the disclosure.

FIG. 9 is a schematic cross-sectional view of a display device according to a sixth embodiment of the disclosure. Referring to FIG. 3 and FIG. 9, a main difference between a display device 20 of the embodiment and the display device 10 of FIG. 1 lies in a different composition of the display device. To be specific, the pixel array module 100A of the display device 20 is a self-luminous display panel, such as an organic light emitting diode (OLED) display panel, a mini light emitting diode (mini-LED) display panel, a micro light emitting diode (micro-LED) display panel, or other self-luminous display panel.

In the embodiment, the first electronically controlled phase retardation module 210 is disposed between the polarizing film 310 and the polarizing film 320, and the second type substrate 302 of the polarizing film 310 directly contacts the conductive layer 201 (as shown in FIG. 3 Shown) of the first electronically controlled phase retardation module 210. The first type substrate 151 is disposed between the polarizing film 320 and the first electronically controlled phase retardation module 210. Namely, the conductive layer 201 of the first electronically controlled phase retardation module 210 may be directly formed on the second type substrate 302 of the polarizing film 310, which helps to reduce the overall thickness of the display device 20 and enhance the light energy usage efficiency. However, the disclosure is not limited thereto. According to other embodiments, the polarizing film 320 that directly contacts the pixel array module 100A may also directly contact the first electronically controlled phase retardation module 210. Namely, the second type substrate 302 of the polarizing film 320 may be used to replace the first type substrate 151, which helps to further reduce the overall thickness of the display device.

In summary, in the display device of an embodiment of the disclosure, by using one of the first polarizing film and the second polarizing film located between the pixel array module and the electronically controlled phase retardation module to directly contact the conductive layer of the electronically controlled phase retardation module, an overall thickness of the display device is effectively reduced, and light energy usage efficiency thereof is enhanced.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A display device, comprising a first polarizing film, a pixel array module, a second polarizing film, and a first electronically controlled phase retardation module, wherein:
    the pixel array module is disposed in overlap with the first polarizing film;
    the second polarizing film is disposed in overlap with the pixel array module; and
    the first electronically controlled phase retardation module is disposed in overlap with the pixel array module, wherein the first electronically controlled phase retardation module comprises a first liquid crystal layer, two first alignment layers, and two first conductive layers, the first liquid crystal layer and the two first alignment layers are disposed between the two first conductive layers, the second polarizing film is located between the pixel array module and the first electronically controlled phase retardation module, one of the first polarizing film and the second polarizing film directly contacts one of the two first conductive layers of the first electronically controlled phase retardation module, the second polarizing film has a polarizer and two second type substrates arranged on two opposite sides of the polarizer, one of the two conductive layers of the first electronically controlled phase retardation module is directly formed on one of the second type substrates of the second polarizing film, and thicknesses of the second type substrates in a direction perpendicular to a horizontal surface of the second polarizing film are the same.

2. The display device as claimed in claim 1, further comprising a third polarizing film, disposed in overlap with the pixel array module, wherein the second polarizing film and the third polarizing film directly contact the two first conductive layers of the first electronically controlled phase retardation module, respectively.

3. The display device as claimed in claim 1, further comprising a third polarizing film and a first type substrate, disposed in overlap with the pixel array module, wherein the first type substrate and one of the second polarizing film and the third polarizing film directly contact the two first conductive layers of the first electronically controlled phase retardation module, respectively.

4. The display device as claimed in claim 3, wherein the first polarizing film, the second polarizing film, and the third polarizing film respectively have a polarizer and two second type substrates disposed on two opposite sides of the polarizer, one of the two first conductive layers of the first electronically controlled phase retardation module directly contacts the second type substrate of one of the second polarizing film and the third polarizing film, and a thickness of the second type substrate is less than a thickness of the first type substrate.

5. The display device as claimed in claim 1, further comprising:
    a third polarizing film, disposed in overlap with the pixel array module;
    a second electronically controlled phase retardation module, disposed in overlap with the first electronically controlled phase retardation module, wherein the second electronically controlled phase retardation module comprises a second liquid crystal layer, two second alignment layers, and two second conductive layers, the second liquid crystal layer and the two second alignment layers are disposed between the two second conductive layers, and the third polarizing film is located between the first electronically controlled phase retardation module and the second electronically controlled phase retardation module; and
    a fourth polarizing film, disposed in overlap with the second electronically controlled phase retardation module, wherein one of the third polarizing film and the fourth polarizing film directly contacts one of the two second conductive layers of the second electronically controlled phase retardation module.

6. The display device as claimed in claim 5, further comprising a first type substrate, disposed in overlap with the second electronically controlled phase retardation module, wherein the first type substrate and one of the third polarizing film and the fourth polarizing film directly contact the two second conductive layers of the second electronically controlled phase retardation module, respectively.

7. The display device as claimed in claim 6, further comprising another first type substrate, disposed in overlap with the first electronically controlled phase retardation module, wherein the pixel array module is located between the first polarizing film and the second polarizing film, and the another first type substrate and one of the second polarizing film and the third polarizing film directly contact the two first conductive layers of the first electronically controlled phase retardation module, respectively.

8. The display device as claimed in claim 1, further comprising a backlight module, disposed in overlap with the pixel array module and the first electronically controlled phase retardation module, wherein the first electronically controlled phase retardation module is located between the pixel array module and the backlight module.

9. The display device as claimed in claim 1, wherein the first electronically controlled phase retardation module is located between the first polarizing film and the second polarizing film, and the pixel array module is a self-luminous display panel.

* * * * *